United States Patent Office 2,851,822
Patented Sept. 16, 1958

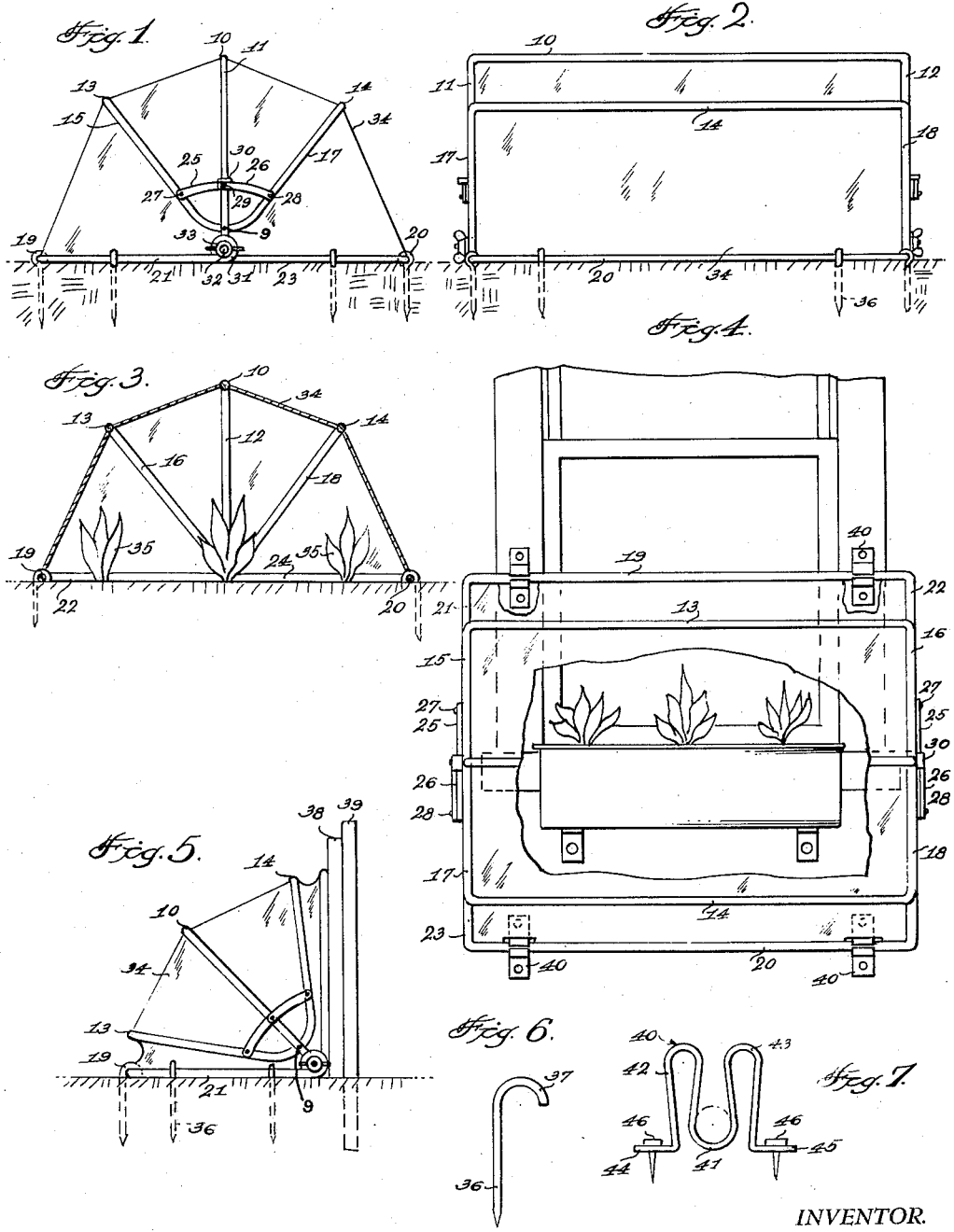

2,851,822

SELECTIVE THREE-POSITION PLANT COVER

Granville D. Fuller, Middleboro, Mass.

Application October 11, 1956, Serial No. 615,396

3 Claims. (Cl. 47—29)

This invention relates to horticulture and particularly protecting devices for plants started early in the spring and growing late in the fall, and in particular a folding frame of aluminum or the like with transparent panels supported by parts of the frame and formed whereby the device is adapted to be positioned over plants in the ground wherein the device is extended to an angle of 180 degrees, or over plants against a wall whereby the device is extended to an angle of 90 degrees, or above and below a window box wherein the device is also extended to an angle of 180 degrees.

The purpose of this invention is to provide a frame, in the form of a miniature hot house wherein plants are covered and protected from frost, wind, and the like and wherein the device may be extended to protect the plants or folded to a nested position when use thereof is not desired.

Various types of coverings and particularly protecting devices have been provided for plants, however, with conventional devices it is difficult to provide anchoring means whereby winds do not blow such devices away or cause the devices to collapse upon plants. Numerous plants are damaged from year to year by collapsing or accidental displacement of such devices. With this thought in mind this invention contemplates a rigid collapsible framework having a sheet of transparent flexible covering material extended between parts thereof with spikes or other devices adapted to anchor one side of the frame to the ground or to a wall, or the like.

The object of this invention is, therefore, to provide a collapsible transparent cover for plants and the like that may readily be anchored in position.

Another object of the invention is to provide a collapsible transparent cover that is adapted to be mounted upon a horizontal surface, a vertical surface, or in a corner between a horizontal and vertical surface.

A further object of the invention is to provide a collapsible transparent cover for protecting plants and the like in which the cover is of a simple and economical construction.

With these and other objects and advantages in view the invention embodies a plurality of pivotally connected U-shaped frames, a sheet of transparent material positioned over and secured to said frames and anchoring spikes or the like for retaining the deivce in an operative position.

Other features and advantages of the invention will appear from the following description taken in connection with the drawing, wherein:

Figure 1 is an end elevational view illustrating the improved transparent cover for plants and the like showing the device positioned upon a horizontal surface.

Figure 2 is a side elevational view of the device with the device positioned as shown in Fig. 1.

Figure 3 is a cross section through the device also showing the device with the parts as shown in Fig. 1.

Figure 4 is a front elevational view, with parts of the covering of the device broken away showing the device mounted over a window box on the outside of a window such as of a residence, hotel, commercial building, or the like.

Figure 5 is an end elevational view showing the device positioned in a corner such as at the foundation of a building with the frame at one side of the device anchored to the ground and with the frame at the opposite side positioned against the outer surface of the wall.

Figure 6 is a view showing one of the anchoring spikes particularly adapted for use in anchoring the device to the ground.

Figure 7 is a view showing a latch or catch for retaining upper and lower members of the end frames to a window frame or on the surface of a building wall, as shown in Fig. 4.

Referring now to the drawing wherein like reference characters denote corresponding parts the improved plant cover of this invention includes a U-shaped intermediate frame having a horizontally disposed bar 10 with arms 11 and 12 at the ends; U-shaped auxiliary frames positioned on opposite sides of the frame 10 and having horizontally disposed bars 13 and 14 with the end bars 15 and 16 extended from the bar 13, and 17 and 18 extended from the bar 14; and end frames having horizontally disposed bars 19 and 20 with arms 21 and 22 extended from ends of the bar 19 and 23 and 24 extended from ends of the bar 20. The auxiliary frames 13 and 14 are pivotally connected at the ends of their respective arms 15 and 16 and 17 and 18 to the lower ends of the arms 11 and 12 of the intermediate U-shaped frame 10 by means of a pivot pin 9, Figs. 1 and 5.

The intermediate frames including the rods 13 and 14 with their corresponding end rods are supported in extended positions with links 25 and 26 at the ends. The links are pivotally connected to the end bars or rods with pins 27 and 28, respectively, and are also connected at the opposite ends by pins 29 to sliding collars 30 on the end rods 11 and 12.

The end rods or arms of the U-shaped frames are provided with hubs 31 which are mounted on pins 32 and the parts are retained in assembled relation with wing nuts 33 threaded on outer ends of the pins or studs.

The U-shaped frames are covered with a sheet of transparent material 34 which may be of plastic or the like and the sheet of material is secured to the frame members by conventional means.

With the parts assembled, particularly as illustrated in Figs. 1 and 3 the device, in the extended position, is positioned over plants 35 and the end frames are anchored to the ground with spikes 36 having arcuate upper ends 37.

By the same means the frames may be folded to an angle of 90 degrees and the end frame on the ground secured in position by the spikes 36 with the frame 20 secured to a wall or panel 38 positioned against a wall 39.

In the design illustrated in Fig. 4 the parts are extended to the position illustrated in Fig. 1 and the rod 19 at one end supported in spring clips 40, as illustrated in Fig. 7. With the end frame at the opposite side extended downwardly the lower rod 20 is also secured by similar spring clips, as indicated by the numeral 40.

The clips 40 are provided with an intermediate arcuate loop 41 positioned between the extended loops 42 and 43 and flanges 44 and 45, extended from outer ends of the loops 42 and 43 are secured to the surface of a wall or outer surface of a window frame with suitable fasteners 46.

The device may therefor be used in a horizontal position, or in a vertical position, or in such a position that one part is on a horizontal surface and the other upon a vertical surface. With the device anchored in position over plants and the like the plants are definitely protected from wind, frost, and other damaging elements. After use the device may be removed, folded, and stored for use the following season.

It will be understood that modifications, within the scope of the appended claims, may be made in the design and arrangement of the parts without departing from the spirit of the invention.

What is claimed is:

1. A plurality of inverted U-shaped frames including end frames, auxiliary frames and an intermediate frame with all of said frames having horizontally disposed members with end members extended therefrom, means pivotally connecting the end members of the frames, a transparent cover secured to the frames, means limiting the pivotal movements of the auxiliary frames with relation to the end and intermediate frames, and anchoring means engaging the end frames for securing the device in position over plants or the like.

2. In a plant protector, the combination which comprises an assembly of inverted U-shaped frames including end frames, auxiliary frames and an intermediate frame with all of said frames having horizontally disposed rods with arms extended from ends of the rods, pins extended through ends of the arms for pivotally connecting the frames, links pivotally connected to arms of the auxiliary frames and slidably connected to the arms of the intermediate frame for limiting the pivotal movements of the auxiliary frames with relation to the intermediate frame, a sheet of transparent material extended over and secured to the frames, and spikes having arcuate upper ends for anchoring the end frames of the protector.

3. In a plant protector, the combination which comprises a plurality of inverted U-shaped frames including end frames, auxiliary frames and an intermediate frame with all of said frames having horizontally disposed members with end members extended therefrom, means pivotally connecting the extended ends of end members of the frames, a sheet of transparent material extended over and secured to the frames, means limiting the pivotal movements of the auxiliary frames, and spring clips adapted to be secured to a surface for receiving horizontally disposed rods of the end frames of the protector.

References Cited in the file of this patent

UNITED STATES PATENTS

| | | |
|---|---|---|
| 935,691 | Rozendal | Oct. 5, 1909 |
| 936,401 | Baldridge | Oct. 12, 1909 |
| 1,805,571 | Davis | May 19, 1931 |

FOREIGN PATENTS

| | | |
|---|---|---|
| 800,208 | France | Apr. 27, 1936 |